(12) United States Patent
Ciais et al.

(10) Patent No.: US 12,151,819 B2
(45) Date of Patent: Nov. 26, 2024

(54) LOOP FOR EXTRACTING WATER FROM AN AIR CONDITIONING SYSTEM OF A CABIN OF AN AIR OR RAIL TRANSPORT VEHICLE

(71) Applicant: LIEBHERR-AEROSPACE TOULOUSE SAS, Toulouse (FR)

(72) Inventors: Viviane Ciais, Toulouse (FR); Arnaud Caron, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 765 days.

(21) Appl. No.: 17/288,901

(22) PCT Filed: Oct. 22, 2019

(86) PCT No.: PCT/FR2019/052517
§ 371 (c)(1),
(2) Date: Apr. 26, 2021

(87) PCT Pub. No.: WO2020/084251
PCT Pub. Date: Apr. 30, 2020

(65) Prior Publication Data
US 2021/0394910 A1    Dec. 23, 2021

(30) Foreign Application Priority Data
Oct. 26, 2018   (FR) ...................................... 1859914

(51) Int. Cl.
*B64D 13/06*  (2006.01)

(52) U.S. Cl.
CPC ...... *B64D 13/06* (2013.01); *B64D 2013/0662* (2013.01)

(58) Field of Classification Search
CPC . B64D 13/06; B64D 13/08; B64D 2013/0662
USPC ............................................................ 454/2
See application file for complete search history.

(56) References Cited

U.S. PATENT DOCUMENTS

| 2,835,340 | A | * | 5/1958 | McGuff ..................... F24F 3/14 55/482 |
| 3,394,533 | A | * | 7/1968 | Li .......................... B01D 53/26 55/438 |
| 5,939,800 | A |   | 8/1999 | Artinian et al. |
| 2005/0011217 | A1 |   | 1/2005 | Brutscher et al. |
| 2011/0146956 | A1 |   | 6/2011 | Stroock et al. |

(Continued)

*Primary Examiner* — Allen R. B. Schult
(74) *Attorney, Agent, or Firm* — CRGO Global; Steven M. Greenberg

(57) ABSTRACT

The invention relates to a loop (40) for extracting water from an air conditioning system of a cabin (5) of an air or rail transport vehicle comprising an air cycle turbine engine (20), the loop comprising: a condenser (41); a three-dimensional mesh grid (45) housed in an outlet box (42) of the condenser and configured to be able to capture water droplets in a stream of moist air condensed by the condenser; a water recovery unit (46) opening on the condenser outlet box (42) and arranged under the three-dimensional mesh grid (45) so as to be able to recover, by force of gravity, the water collected by the three-dimensional mesh grid (45); an air return pipe (44) linking the outlet box (42) to a supply interface for directly or indirectly supplying the turbine of the air conditioning system.

12 Claims, 3 Drawing Sheets

(56) References Cited

U.S. PATENT DOCUMENTS

Figure 1:
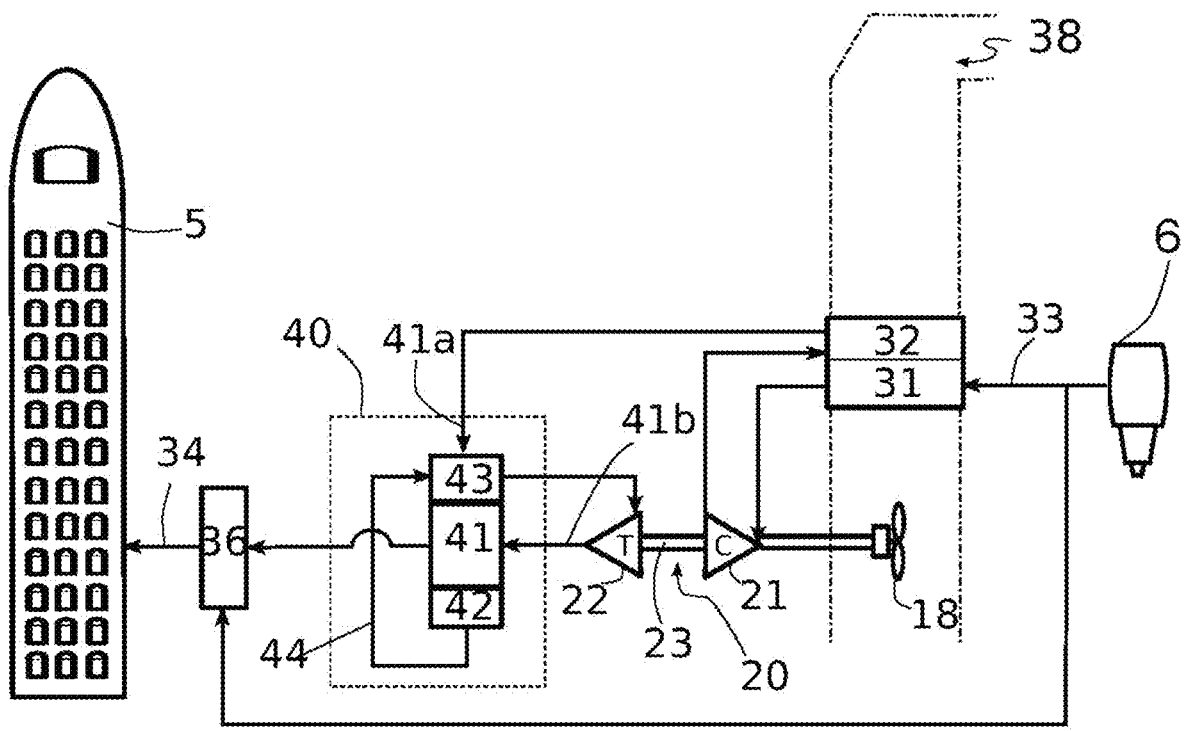

2012/0199315 A1     8/2012   Barreau et al.
2015/0013355 A1     1/2015   Klimpel et al.

* cited by examiner

LOOP FOR EXTRACTING WATER FROM AN AIR CONDITIONING SYSTEM OF A CABIN OF AN AIR OR RAIL TRANSPORT VEHICLE

CROSS-REFERENCE TO RELATED APPLICATIONS

This application is a § 371 national phase entry of International Application No. PCT/FR2019/052517, filed Oct. 22, 2019, which claims priority to French Patent Application No. 1859914, filed Oct. 26, 2018.

1. TECHNICAL FIELD OF THE INVENTION

The invention relates to a loop for extracting water intended to be provided for an air conditioning system or an air cooling system of an air or rail transport vehicle.

2. TECHNOLOGICAL BACKGROUND

An air conditioning or cooling system of an aircraft comprises, in a known manner, a device for collecting compressed air from at least one compressor of a propulsion engine of the aircraft and an air cycle turbine engine comprising at least one compressor and an expansion turbine. The compressor of the air cycle turbine engine is supplied with air by the compressed air collection device after passing through a flow rate or pressure regulating valve, and the turbine of the turbine engine comprises an air outlet which supplies a mixing chamber connected to the cabin so as to be able to supply the cabin with air at a controlled temperature and flow rate. The system further comprises various heat exchangers, regulating valves and a water extraction loop.

This extraction loop is intended to dry the air before it is injected into the turbine of the air cycle turbine engine in order to be expanded and distributed to a mixing chamber connected to the cabin of the aircraft.

The thermodynamic performance of an air conditioning system (also referred to as an air conditioning pack) is related to the water extraction performance by the water extraction loop. In addition, a high-performance water extraction loop increases the reliability of the conditioning pack by preventing erosion of the turbine.

A water extraction loop generally comprises a heater formed by an air/air heat exchanger, a condenser also formed by an air/air heat exchanger, and a water extractor (also referred to as a water separator).

Most current air conditioning systems employ centrifugal water separators, also referred to as vortex technology water extractors. Such a water separator consists of a propeller configured to be able to rotate the air charged with water droplets and drive these water droplets by centrifugation toward the side walls of the separator, which themselves are provided with a device for recovering centrifuged water droplets.

One of the drawbacks of such a separator is its bulk and its mass, which can be significant, in particular when high dehumidification performance is desired. In addition, the separator is generally arranged at the outlet of a heat exchanger or of a turbine. It is therefore necessary to connect the separator to the outlet of the exchanger or to the outlet of the turbine by an air pipe, which makes the integration bulky. This impacts the overall performance of the aircraft, in particular in terms of fuel consumption.

In addition, such a separator is capable of generating significant head losses, which result in particular from the friction of the stream of air on the side walls of the separator. The inventors have in particular determined that the head losses of such a centrifugal separator can be of the order of 3 times greater than those observed in a hose of the same diameter and without a propeller. These are not only the head losses linked to the presence of the propeller, but also the head losses in the hose downstream of the propeller. This head loss is therefore not very compatible with the new lines of aircraft, which aim to limit the draw on the aircraft engines as much as possible.

Finally, such a separator requires assembling a large number of parts, which complicates the manufacturing methods of such a separator.

In other words, current water separators suffer from a triple drawback of their weight, the induced head losses and the complexity of their manufacture.

The inventors have therefore sought to propose a new water extraction device which makes it possible to overcome this triple drawback.

3. AIMS OF THE INVENTION

The invention aims to provide a water extraction loop which overcomes at least some of the drawbacks of the known separators.

The invention aims in particular to provide, in at least one embodiment, a water extraction loop which has a limited weight and bulk compared to the known separators.

The invention also aims to provide, in at least one embodiment, a water extraction loop which is more permeable than the water extraction loops that are currently available.

The invention also aims to provide, in at least one embodiment, a water extraction loop of which the manufacturing and assembly costs are lower than the manufacturing and assembly costs of the water extraction loops that are currently available.

The invention also aims to provide an air conditioning system provided with a water extraction loop according to the invention.

4. DISCLOSURE OF THE INVENTION

To do this, the invention relates to a loop for extracting water from an air conditioning system of a cabin of an air or rail transport vehicle comprising an air cycle turbine engine.

A water extraction loop according to the invention further comprises a condenser comprising a first air circuit, called a moist air circuit, extending between a moist air inlet mouth and a moist air outlet box, intended to convey a stream of moist air loaded with water vapor, and a second circuit, called a dry air circuit, extending between a dry air inlet and a dry air outlet, in thermal interaction with said moist air circuit and intended to convey a stream of air coming from a turbine of said air cycle turbine engine to allow condensation of said stream of moist air.

A water extraction loop according to the invention is characterized in that it further comprises:

- a three-dimensional mesh grid housed in said outlet box of said condenser and configured to be able to capture the water droplets from said stream of moist air condensed by said condenser,
- a water recovery unit opening on said outlet box of said condenser and arranged under said three-dimensional mesh grid in order to be able to recover, by force of gravity, the water collected by said three-dimensional mesh grid, said recovery unit further being provided with a discharge port for the recovered water, an air return pipe linking said outlet box of said condenser to a supply interface for directly or indirectly supplying said turbine of said air cycle turbine engine of said air conditioning system.

A water extraction loop according to the invention therefore has the specific feature of utilizing a three-dimensional mesh grid (also referred to as three-dimensional mesh structure), arranged directly in the outlet box of the condenser (that is to say, in the condenser compartment arranged immediately downstream of the heat exchange matrix of the condenser) to ensure the collection of the water droplets condensed by the condenser. The function of the condenser is to cool the air below its dew point and the function of the three-dimensional mesh grid is to extract and capture the water droplets from the stream of moist air condensed by the condenser. In other words, one of the specific features of the invention is to integrate the water extraction function directly into the condenser outlet box and to replace the vortex extractor of the prior art with a three-dimensional mesh grid. A condenser according to the invention therefore combines the cooling function a condenser of the prior art and the water extraction function of a water separator of the prior art.

A water extraction loop according to the invention therefore bypasses centrifugal systems to extract water from the stream of moist air so that the air stream, in a loop according to the invention, is disturbed little by the water extraction, which significantly reduces the head losses compared to the extraction loops of the prior art.

In addition, the water extraction loop according to the invention comprises a water recovery unit arranged under the mesh grid in order to be able to recover the water droplets captured by the collection grid. This water recovery unit opens onto the outlet box, that is to say, it is also housed under the mesh grid which is housed in the outlet box. This recovery unit acts as a stilling and water recovery zone by being arranged under the outlet box and therefore not interfering with the stream of air which circulates in the outlet box toward the return pipe. In other words, the presence of the water recovery unit and its arrangement make it possible to protect the water from the stream of air and to conduct the water by natural gravity toward the water discharge port.

The water extraction loop according to the invention also has a reduced mass and bulk compared to the loops of the prior art due to the absence of air circulation pipes between the condenser and the return pipe and the absence of vortex zones. In particular, the water collection is carried out directly in the outlet of the condenser. In other words, the three-dimensional mesh water collection grid is housed in the casing of the condenser, which reduces the number of parts to be assembled in order to form an extraction loop according to the invention.

According to the invention, an air return pipe links the outlet box of the condenser to a supply interface for directly or indirectly supplying said turbine of said air conditioning system. In other words, the water extraction loop according to the invention comprises a dry air outlet which is formed by a supply interface which can be either linked directly to the turbine of the air cycle turbine engine, or to an ancillary device such as a heater.

The return pipe is preferably configured, on the one hand, to be able to minimize the speeds of the stream of air and, on the other hand, to direct the stream of air so that it circulates in the opposite direction to gravity.

A water extraction loop according to the invention is intended to be provided for an air conditioning system for a cabin of an air or rail transport vehicle. Such an air conditioning system comprises a turbine engine comprising at least one compressor and one turbine which are mechanically linked to one another. The water extraction loop according to the invention is advantageously arranged fluidly between the compressor and the expansion turbine so that the air which circulates through the three-dimensional mesh grid has an absolute pressure, as a general rule, between 2 and 5 bars. The three-dimensional mesh grid of the loop according to the invention is therefore configured to be able to capture the water droplets from a stream of air having a pressure between 2 and 5 bars, that is to say, a pressure greater than that of the distribution air in the cabin, which is generally between 0.7 and 1.2 bars.

Advantageously and according to the invention, said condenser comprises a thermal exchange matrix configured to ensure thermal exchanges between said moist air circuit and said dry air circuit, and said three-dimensional mesh grid is housed in said outlet box of the condenser at a distance less than or equal to 100 mm from said heat exchange matrix of said condenser.

A water extraction loop according to this variant makes it possible to capture the water droplets as close as possible to the matrix of the condenser and thus to increase the efficiency of the water extraction.

The inventors have in particular determined that the best extraction performance is obtained when the grid is arranged as close as possible to the heat exchange matrix of the condenser.

Advantageously and according to this variant, said condenser outlet box defines an air passage section of the moist air circuit and said three-dimensional mesh grid extends over the entirety of this air passage section.

A water extraction loop according to this variant makes it possible to maximize the water collection zone by providing a three-dimensional mesh grid which extends over the entire air passage section.

Advantageously and according to the invention, the three-dimensional mesh grid is arranged in the axis of said moist air circuit of said condenser.

According to this variant, the three-dimensional mesh grid is in the axis of the moist air circuit of the condenser, that is to say, the grid is housed on the axis of circulation of the moist fluid which extends between the moist air inlet mouth into the condenser and the inlet of the moist air outlet box.

A water extraction loop according to this variant limits the head losses by eliminating any air deflection between the condenser and the water droplet capture grid. In other words, the air is not deflected between the inlet of the condenser and the grid for capturing the water droplets from the stream of moist air condensed by the condenser. However, moist air can be deflected through the three-dimensional mesh grid, depending on the position of the return pipe, but not upstream of the grid.

Advantageously and according to the invention, the discharge port of said water recovery unit forms a low point of said recovery unit.

This advantageous variant facilitates the discharge of water from the water recovery unit to a dedicated zone.

Advantageously, a water extraction loop according to the invention comprises a heater comprising a first air circuit extending between a moist air inlet and a moist air outlet opening into said moist air inlet of said condenser, and a second air circuit, in thermal interaction with said first air circuit, and extending between a dry air inlet supplied by said return pipe and a dry air outlet supplying said inlet of said turbine of said air cycle turbine engine.

This advantageous variant makes it possible to increase the temperature of the air which supplies the turbine of the air cycle machine, which makes it possible to vaporize any water droplets which are not captured by the three-dimensional mesh grid, which protects the turbine, and to improve the performance of the expansion turbine of the air cycle turbine engine.

Advantageously and according to the invention, said condenser and said heater are assembled to form a single block.

This variant makes it possible to obtain a compact water extraction loop which limits the number of parts necessary to form the loop.

It is also possible to provide for welding the condenser and the heater, or even the return pipe.

Advantageously and according to the invention, said three-dimensional mesh grid is formed from one or more of the following materials: aluminum, steel, metal alloy, ceramic, plastics material.

Advantageously and according to the invention, said three-dimensional mesh grid comprises polyhedral meshes.

According to this variant, the meshes can be formed by all types of polyhedra, in particular hexahedra, dodecahedra, tetradecahedra, etc.

Of course, other shapes of mesh can be used to form a three-dimensional mesh grid according to the invention.

For example, according to another variant, the mesh grid can also be formed by metal wires which are interwoven and connected to one another. These metal wires are, for example, interlaced helical threads which form at least three distinct planes orthogonal to one another so that the interlaced helical wires of a first plane intersect the interwoven helical wires of at least one other plane, so as to form a three-dimensional grid.

The three-dimensional mesh grid can also be formed by a plurality of two-dimensional grids which each extend in planes parallel to one another, or partially intersecting one another, to form a three-dimensional structure for collecting water droplets.

A three-dimensional mesh grid of a water extraction loop according to the invention can, for example, result from an additive manufacturing method, such as 3D printing. The mesh grid may, according to another variant, be obtained from a foundry method or from a method for weaving braided wires.

Advantageously and according to the invention, said three-dimensional mesh grid has a porosity greater than 60%, preferably greater than 70%. The invention also relates to an air conditioning system for a cabin of an air or rail transport vehicle comprising an air cycle turbine engine comprising an air compressor and an expansion turbine mechanically coupled to said air compressor, heat exchangers configured to be able to ensure heat exchanges between air taken from an engine of the transport vehicle and air at dynamic pressure so as to be able to supply cooled air to said compressor of said air cycle turbine engine, and a mixing chamber supplied by said expansion turbine and adapted to be able to be linked to said cabin of the vehicle to be supplied with air at a controlled pressure and temperature, characterized in that it further comprises a water extraction loop according to the invention arranged between said heat exchangers, said turbine and said mixing chamber, so as to be able to dry the air supplying the expansion turbine of the air cycle turbine engine.

The advantages and technical effects of a water extraction loop according to the invention apply, mutatis mutandis, to an air conditioning system according to the invention.

The invention also relates to an air or rail transport vehicle comprising a cabin, characterized in that it further comprises an air conditioning system according to the invention for conditioning said cabin.

The invention also relates to a water extraction loop, an air conditioning system and an aircraft, characterized in combination by all or some of the features mentioned above or below.

5. LIST OF FIGURES

Figure 2:
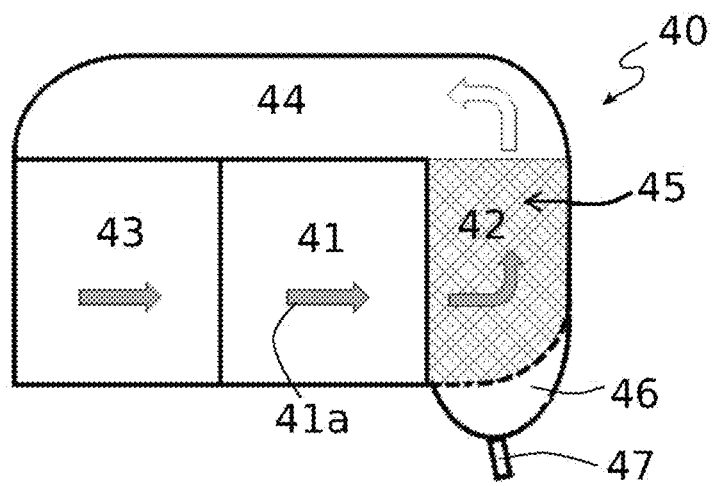
Figure 3:
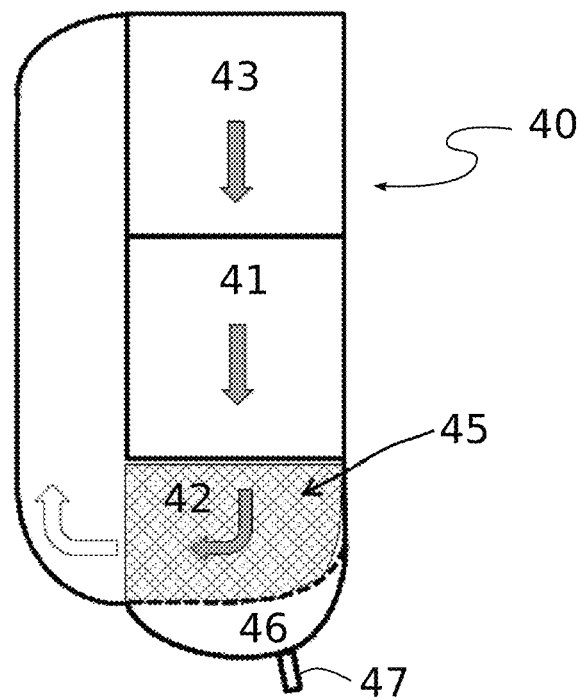
Figure 4:
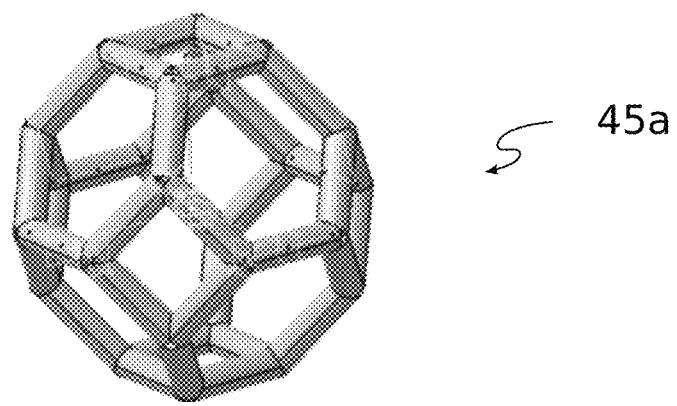
Figure 5:
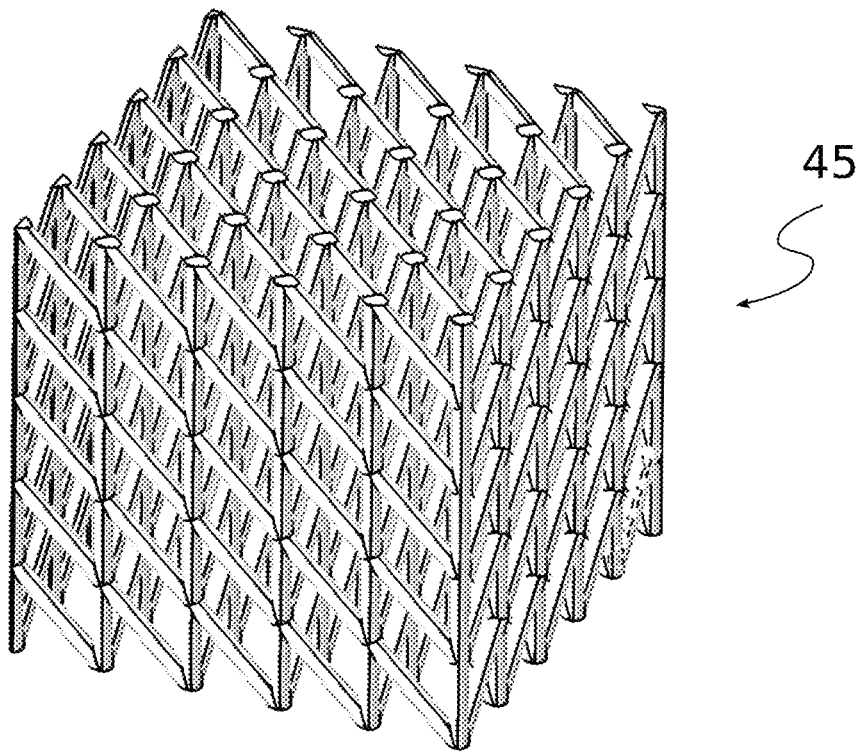
Figure 6:
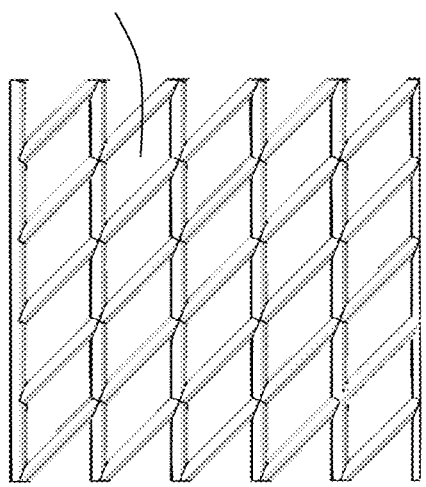
Figure 7:
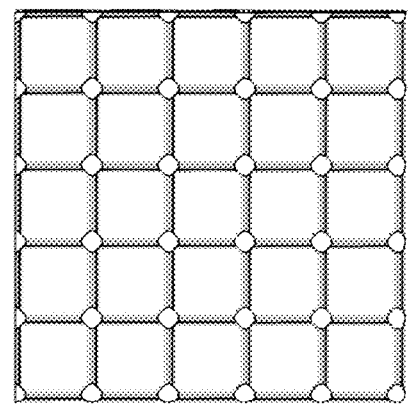

Further objectives, features and advantages of the invention will become apparent upon reading the following description, which is provided solely by way of non-limiting example, and which refers to the appended drawings, in which:

FIG. 1 is a functional schematic view of an air conditioning system according to one embodiment of the invention, FIG. 2 is a functional schematic view of a pod of a water extraction loop according to one embodiment of the invention, FIG. 3 is a schematic view of a capture grid of a water extraction loop according to one embodiment of the invention, FIG. 4 is a schematic perspective view of a mesh of a three-dimensional mesh grid of a water extraction loop according to one embodiment of the invention, FIG. 5 is a schematic perspective view of a three-dimensional mesh grid of a water extraction loop according to one embodiment of the invention, FIG. 6 is a schematic front view of the mesh grid of FIG. 5, FIG. 7 is a schematic top view of the mesh grid of FIG. 5.

6. DETAILED DESCRIPTION OF ONE EMBODIMENT OF THE INVENTION

For the sake of illustration and clarity, scales and proportions are not strictly adhered to in the figures. Throughout the detailed description which follows with reference to the figures, unless otherwise indicated, each element of the water extraction loop is described as it is arranged when the loop is provided for an air conditioning system as shown schematically in FIG. 1.

Moreover, identical, similar or analogous elements are denoted using the same reference signs throughout the figures.

FIG. 1 schematically shows an aircraft comprising a passenger cabin 5, and at least one main engine 6. This main engine 6 dedicated to the propulsion of the aircraft comprises, for example, a compressor and a turbine not shown in FIG. 1.

FIG. 1 also schematically illustrates an air conditioning system, better known by the acronym ECS for Environmental Control System, the function of which is to supply the cabin 5 of the aircraft with air at a controlled temperature and pressure.

This air conditioning system is formed by an air conditioning pack formed by a set of members enclosed in a casing or housing and having air inlet and outlet connection ports and a dynamic air circulation channel, better known as RAM air, through one or more heat exchangers.

Such a pack may be the subject of numerous variant embodiments which are compatible with a water extraction loop according to the invention. FIG. 1 schematically illustrates one of the possible variant embodiments.

Thus, the system of FIG. 1 comprises an air cycle turbine engine 20 formed by a compressor 21 and an expansion turbine 22 linked to one another by a rotary shaft 23. The turbine engine 20 also comprises a fan 18 configured to be able to ensure the circulation of dynamic air, known by the acronym RAM, through heat exchangers 31, 32. According to the embodiment of the figure, the fan 18 is mounted on the rotary shaft 23 linking the compressor 21 and the turbine 22. According to another embodiment, the fan can be driven in rotation by other means, such as, for example, by electrical means.

The air conditioning pack is supplied with air collected from a compressor of the engine 6 of the aircraft via an air bleed line 33. The bleed line 33 is preferably provided with a valve controlled by a control logic so as to be able to adapt the flow rate and/or the air pressure supplied to the pack as required. This valve is not shown in the figures for the sake of clarity.

The air conditioning pack supplies the cabin 5 via a cabin inlet pipe 34.

A first circuit of an air/air heat exchanger 32, better known under the name MHX, is interposed between the outlet of the compressor 21 and the inlet of the turbine 22 so as to be able to cool the air compressed by the compressor 21 before its introduction into the air inlet of the turbine 22. Downstream of the heat exchanger 32, the stream of compressed and cooled air passes through a water extraction loop 40 according to the invention and described below.

The cold air expanded at the outlet of the turbine 22 passes through the condenser 41 of the water extraction loop 40 to be cooled there before supplying a mixing chamber 36. This mixing chamber 36 can also be supplied with air collected from the engine of the aircraft, by controlling regulating valves, not shown in the figures, arranged on the pipe linking the air intake on the engine of the aircraft and this mixing chamber, before supplying the cabin through the pipe 34.

The heat exchanger 32 also comprises a second circuit passed through by air at dynamic pressure coming from at least one air intake mouth 38 for cooling the heated compressed air between the compressor 21 and the turbine 22.

In addition, a first circuit of an air/air cooling heat exchanger 31, better known under the name of PHX exchanger, is interposed between the pipe 33 delivering the air taken from the engine 6 of the aircraft and the air inlet of the compressor 21. The second circuit of this heat exchanger 31 is passed through by air at dynamic pressure coming from the air intake mouth 38. This heat exchanger 31 thus makes it possible to cool the air entering the air conditioning pack before it enters the compressor 21 of the air cycle turbine engine 20.

Air circulation in the second circuits of the heat exchangers 31, 32 is provided by the fan 18.

Each heat exchanger 31, 32 allows a heat transfer between its first circuit and its second circuit according to the temperature difference of the streams of air respectively passing through each circuit.

FIGS. 2 and 3 schematically illustrate an extraction loop 40 according to two embodiments of the invention.

The main difference between the two embodiments concerns the orientation of the extraction loop. However, the operating principle is identical in each of the two modes.

The water extraction loop 40 thus comprises a condenser 41, which is an air/air heat exchanger comprising a first air circuit, called a moist air circuit 41a, which extends between a moist air inlet mouth and a moist air outlet box 42. This moist air circuit 41a is intended to convey a stream of air coming from the air collected from the propulsion engine 6 of the aircraft, after cooling by the heat exchanger 32.

The condenser 41 also comprises a second circuit, called the dry air circuit 41b, which extends between a dry air inlet and a dry air outlet. This dry air circuit 41b is not shown in FIGS. 2 and 3 insofar as it extends perpendicular to the plane of the illustration. The dry air circuit 41b is visible in FIG. 1. This circuit is intended to convey the air coming from the turbine 22 of the air cycle turbine engine.

The circuits 41a and 41b are in thermal interaction, for example by means of an exchange matrix, which is, for example, formed by a stack of metal plates delimiting the two air circuits.

According to the embodiment of the figures, the water extraction loop 40 also comprises a heater 43 comprising a first air circuit intended to convey the stream of moist air coming from the heat exchanger 32, which opens into the moist air circuit 41a of the condenser, in interaction with a second air circuit 43b, supplied by a return loop 44 which conveys the air dried by the condenser, and intended to supply the turbine 22 of the turbine engine 20.

In addition, the water extraction loop 40 comprises a three-dimensional mesh grid 45 housed in the condenser outlet box 42. This grid is configured to be able to capture the water droplets from the stream of moist air 41a condensed by the condenser. Preferably, this grid is housed in the outlet box 42 at a distance of 50 mm from the condenser exchange matrix 41.

According to another advantageous embodiment, the mesh grid is bonded to the exchange matrix of the condenser 41 to improve the efficiency of the water extraction.

This mesh grid 45 can be of any type. It is, for example, formed of metallic wires which are interwoven and connected to one another. These metallic wires are, for example, interwoven helical wires which form at least two distinct planes orthogonal to one another so that the interwoven helical wires of a first plane intersect the interwoven helical wires of at least one other plane, so as to form a three-dimensional grid.

According to another embodiment, the mesh grid is formed from a plurality of cubic, dodecahedral or tetradecahedral meshes.

FIG. 4 schematically illustrates such a tetradecahedral mesh 45a.

FIGS. 5, 6 and 7 illustrate another embodiment of a three-dimensional mesh grid 45. Each mesh 45a of this grid is a polyhedron with diamond faces.

The water extraction loop according to the invention further comprises a water recovery unit 46 which opens under the outlet box 42 of the condenser while being arranged under the three-dimensional mesh grid 45.

Thus, the water recovery unit 46 can recover, by force of gravity, the water collected by the three-dimensional mesh grid 45. The recovery unit is further provided with a port 47 for discharging the recovered water, which is preferably arranged at the low point of the water recovery unit 46.

The water extraction loop 40 also comprises an air return pipe 44 which links the outlet box 42 of the condenser to the heater 43.

According to another embodiment, the air return pipe 44 can be linked directly to the turbine 22. This embodiment then forms a water extraction loop devoid of a heater.

In FIG. 2, the heater 23, the condenser 41 and the outlet box 42 of the condenser are intended to be arranged horizontally and the return air pipe 44 extends above these three elements so that the stream circulating in the return pipe 44 or in a horizontal direction opposite the direction of circulation of the stream in the heater and the condenser. In FIG. 3, the heater 43, the condenser 41 and the outlet box 42 extend vertically and the return pipe 44 extends vertically so that the stream circulating in the return pipe is in the opposite direction with respect to the stream circulating in the heater and the condenser.

One of the important aspects of the invention is the arrangement of a three-dimensional mesh grid for collecting water droplets directly in the outlet box of the condenser. This aspect is particularly effective in the context of a water extraction loop intended to be provided for an air conditioning system of an aircraft. The combination of this technical feature with the technical feature according to which the loop comprises a water recovery unit which opens on the outlet box while being arranged under the mesh grid to be able to recover the water by force of gravity and form a stilling zone which does not interfere with the stream of air, makes it possible to form a compact and efficient water extraction loop.

This aspect could also be implemented in a two-phase cycle cooling device, better known by the acronym VCS (for Vapor Cooling System), comprising a two-phase liquid/vapor coolant entrained in a closed thermal loop comprising at least one compressor and an evaporator, the vaporization of the coolant fluid causing the production of a cold capacity to ensure the cooling of on-board equipment or the cooling of cabin air. The three-dimensional mesh grid could thus be arranged at the outlet of the evaporator.

The invention claimed is:

1. A loop for extracting water from an air conditioning system of a cabin of an air or rail transport vehicle comprising an air cycle turbine engine, said loop comprising:
    a condenser comprising a first air circuit, called a moist air circuit, extending between a moist air inlet mouth and a moist air outlet box, intended to convey a stream of moist air loaded with water vapor, and a second circuit, called a dry air circuit, extending between a dry air inlet and a dry air outlet, in thermal interaction with said moist air circuit and intended to convey a stream of air coming from a turbine of said air cycle turbine engine to allow condensation of said stream of moist air,
    a three-dimensional mesh grid housed in said outlet box of said condenser and configured to be able to capture the water droplets from said stream of moist air condensed by said condenser,
    a water recovery unit opening on said outlet box of said condenser and arranged under said three-dimensional mesh grid in order to be able to recover, by force of gravity, the water collected by said three-dimensional mesh grid, said recovery unit further being provided with a discharge port for the recovered water,
    an air return pipe linking said outlet box of said condenser to a supply interface for directly or indirectly supplying said turbine of said air cycle turbine engine of said air conditioning system.

2. The water extraction loop according to claim 1, wherein said condenser comprises a thermal exchange matrix configured to ensure thermal exchanges between said moist air circuit and said dry air circuit, and in that said three-dimensional mesh grid is housed in said outlet box of the condenser at a distance less than or equal to 100 mm from said heat exchange matrix of said condenser.

3. The water extraction loop according to claim 1, wherein said condenser outlet box defines an air passage section of the moist air circuit and in that said three-dimensional mesh grid extends over the entirety of this air passage section.

4. The water extraction loop according to claim 1, wherein said three-dimensional mesh grid is arranged in the axis of said moist air circuit of said condenser.

5. The water extraction loop according to claim 1, wherein said discharge port of said recovery unit forms a low point of said recovery unit.

6. The water extraction loop according to claim 1, wherein it further comprises a heater comprising a first air circuit extending between a moist air inlet and a moist air outlet, opening into said moist air inlet of said condenser, and a second air circuit, in thermal interaction with said first air circuit, and extending between a dry air inlet supplied by said return pipe and a dry air outlet supplying said inlet of said turbine of said air cycle turbine engine.

7. The water extraction loop according to claim 6, wherein said condenser and said heater are assembled to form a single block.

8. The water extraction loop according to claim 1, wherein said three-dimensional mesh grid is formed from one or more of the following materials: aluminum, steel, metal alloy, ceramic, plastics material.

9. The water extraction loop according to claim 1, wherein said three-dimensional mesh grid comprises polyhedral meshes.

10. The water extraction loop according to claim 1, wherein said three-dimensional mesh grid has a porosity greater than 60%.

11. An air conditioning system for a cabin of an air or rail transport vehicle comprising an air cycle turbine engine comprising an air compressor and an expansion turbine mechanically coupled to said air compressor, heat exchangers configured to be able to ensure heat exchanges between air taken from an engine of the transport vehicle and air at dynamic pressure so as to be able to supply cooled air to said compressor of said air cycle turbine engine, and a mixing chamber supplied by said expansion turbine and adapted to be able to be linked to said cabin of the vehicle to be supplied with air at a controlled pressure and temperature, characterized in that it further comprises a water extraction loop arranged between said heat exchangers, said turbine and said mixing chamber, so as to be able to dry the air supplying the expansion turbine of the air cycle turbine engine
    the loop comprising:
    a condenser comprising a first air circuit, called a moist air circuit, extending between a moist air inlet mouth and a moist air outlet box, intended to convey a stream of moist air loaded with water vapor, and a second circuit, called a dry air circuit, extending between a dry air inlet and a dry air outlet, in thermal interaction with said moist air circuit and intended to convey a stream of air coming from a turbine of said air cycle turbine engine to allow condensation of said stream of moist air,
    a three-dimensional mesh grid housed in said outlet box of said condenser and configured to be able to capture the water droplets from said stream of moist air condensed by said condenser,
    a water recovery unit opening on said outlet box of said condenser and arranged under said three-dimensional mesh grid in order to be able to recover, by force of gravity, the water collected by said three-dimensional mesh grid, said recovery unit further being provided with a discharge port for the recovered water, an air return pipe linking said outlet box of said condenser to a supply interface for directly or indirectly supplying said turbine of said air cycle turbine engine of said air conditioning system.

12. An air or rail transport vehicle comprising:

a cabin comprising an air conditioning system for conditioning said cabin the air conditioning system comprising:

an air cycle turbine engine comprising an air compressor and an expansion turbine mechanically coupled to said air compressor, heat exchangers configured to be able to ensure heat exchanges between air taken from an engine of the transport vehicle and air at dynamic pressure so as to be able to supply cooled air to said compressor of said air cycle turbine engine, and a mixing chamber supplied by said expansion turbine and adapted to be able to be linked to said cabin of the vehicle to be supplied with air at a controlled pressure and temperature, characterized in that it further comprises a water extraction loop arranged between said heat exchangers, said turbine and said mixing chamber, so as to be able to dry the air supplying the expansion turbine of the air cycle turbine engine, the loop comprising:

a condenser comprising a first air circuit, called a moist air circuit, extending between a moist air inlet mouth and a moist air outlet box, intended to convey a stream of moist air loaded with water vapor, and a second circuit, called a dry air circuit, extending between a dry air inlet and a dry air outlet, in thermal interaction with said moist air circuit and intended to convey a stream of air coming from a turbine of said air cycle turbine engine to allow condensation of said stream of moist air, a three-dimensional mesh grid housed in said outlet box of said condenser and configured to be able to capture the water droplets from said stream of moist air condensed by said condenser, a water recovery unit opening on said outlet box of said condenser and arranged under said three-dimensional mesh grid in order to be able to recover, by force of gravity, the water collected by said three-dimensional mesh grid, said recovery unit further being provided with a discharge port for the recovered water, an air return pipe linking said outlet box of said condenser to a supply interface for directly or indirectly supplying said turbine of said air cycle turbine engine of said air conditioning system.

* * * * *